US006921866B2

(12) United States Patent
Golner et al.

(10) Patent No.: US 6,921,866 B2
(45) Date of Patent: Jul. 26, 2005

(54) METHOD AND APPARATUS FOR CONNECTING HIGH VOLTAGE LEADS TO A HIGH TEMPERATURE SUPER-CONDUCTING TRANSFORMER

(75) Inventors: Thomas M. Golner, Pewaukee, WI (US); Shirish P. Mehta, Waukesha, WI (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 90 days.

(21) Appl. No.: 10/175,885

(22) Filed: Jun. 21, 2002

(65) Prior Publication Data
US 2005/0016758 A1 Jan. 27, 2005

Related U.S. Application Data
(60) Provisional application No. 60/342,094, filed on Dec. 26, 2001.

(51) Int. Cl.[7] .............................................. H01B 12/00
(52) U.S. Cl. ..................................................... 174/125.1
(58) Field of Search ........................... 174/125.1, 118 H, 174/128 H, 148 H, 15.4, 18, 24, 26 R, 71 R, 73.1, 74 R, 75 C, 78, 84 R

(56) References Cited

U.S. PATENT DOCUMENTS

| 3,728,463 A | * | 4/1973 | Kullmann et al. | ......... 174/12 R |
| 6,049,036 A | * | 4/2000 | Metra | ......................... 174/15.5 |
| 2002/0019315 A1 | * | 2/2002 | Nassi et al. | .................. 505/150 |

* cited by examiner

Primary Examiner—William H. Mayo, III
(74) Attorney, Agent, or Firm—Baker & Hostetler LLP

(57) ABSTRACT

A method and apparatus for connecting high voltage leads to a super-conducting transformer is provided that includes a first super-conducting coil set, a second super-conducting coil set, and a third super-conducting coil set. The first, second and third super-conducting coil sets are connected via an insulated interconnect system that includes insulated conductors and insulated connectors that are utilized to connect the first, second, and third super-conducting coil sets to the high voltage leads.

20 Claims, 2 Drawing Sheets

METHOD AND APPARATUS FOR CONNECTING HIGH VOLTAGE LEADS TO A HIGH TEMPERATURE SUPER-CONDUCTING TRANSFORMER

CLAIM OF PRIORITY

This application claims priority to U.S. provisional patent application no. 60/342,094, filed Dec. 26, 2001.

This invention was made with government support under the High Temperature Super-Conducting Transformer contract awarded by the Department of Energy. The government may have certain rights in the invention.

FIELD OF THE INVENTION

This invention relates to transformers. More particularly, this invention is directed to a method and apparatus for connecting high voltage leads from a power supply to a coil set of a high temperature super-conducting transformer.

BACKGROUND OF THE INVENTION

High temperature super-conducting transformers (HTS), e.g., those operating in the temperature ranges of −487° F. (−253° C.) to −385° F. (−196° C.), are relatively new when compared to conventional oil-filled transformers. HTS transformers are revolutionary in that they use high temperature super-conducting materials instead of copper windings to transform voltage levels.

In transforming a voltage supply from one voltage level to another voltage level, heat is generated within the transformer. In conventional oil-filled transformers oil is circulated through the transformer to transfer heat from the copper windings to the oil. The oil is then returned to a radiator where it is cooled.

However, in conventional oil-filled transformers, the oil is not only utilized as a material for heat transfer, but also as a dielectric material to prevent current from flowing between two components or parts of the transformer that are at different potentials. The use of oil as a dielectric medium is important because without the oil there is a potential for the occurrence of flashovers that could lead to failures in the performance of the transformer. A flashover involves an electiric arc or spark, i.e., the flow of current, between two components of different potentials when the dielectric material between the two components breaks down and conducts current.

However, oil is not needed in HTS transformers and HTS transformers can operate in low conductivity vacuum environments. Thus, because HTS transformers do not require oil, HTS transformers can be made smaller and lighter than conventional oil-filled transformers. In addition, HTS transformers can be placed in environments where conventional oil-filled transformers would not traditionally be placed.

In HTS transformers, super-conducting materials are utilized, rather than the copper windings, to transform a voltage supply from one level to another. An impressive characteristic of super-conducting materials is that they are able to conduct current with almost no resistance. Thus, super-conducting materials generate less heat than conventional oil-filled transformers.

A disadvantage of HTS transformers is that the dielectric strength of a vacuum is less than the dielectric strength of oil. Thus, conventional methods of constructing HTS transformers, which rely on oil being utilized as a dielectric between components of different voltage potentials, are not always suitable for HTS transformers because oil is not present.

For example, the method for constructing the interconnect system of conventional oil filled transformers is not suitable for HTS transformers. The interconnect system of transformers includes the electrical connections between the leads of the coil sets of the transformer to establish the phases of the transformer. In addition the interconnect system may include electrical connections between the high voltage leads from a power supply and the leads from the coil sets.

In conventional oil-filled transformers, the leads from the inputs and outputs of the coil sets may be at different voltage potentials from other components within the transformer. Further, the high voltage leads brought into the transformer may be at a different potential than the leads from the coil sets. However, the presence of oil in conventional oil-filled transformers helps to prevent flashover that may occur between transformer components at different voltage potentials. Further, there is sufficient space within the transformer to establish adequate dielectric clearances, i.e., a minimum distance between two objects to prevent flashover. Consequently, transformer failures are reduced and the lifetime of the transformer is extended.

However, the components of HTS transformers function within a vacuum environment and the dielectric strength of the vacuum environment is not as strong as an oil-filled environment. Further, cooling devices that create the −487° F. (−253° C.) to −385° F. (−196° C.) environment within HTS transformers reduce the space in HTS transformers, such that adequate dielectric clearances cannot be provided between components at different voltage potentials. Accordingly, it is desirable to provide methods and/or devices that prevent flashover within HTS transformers.

Further, it is desirable to provide methods and/or devices for connecting high voltage leads from a voltage supply to leads from HTS coil sets that avoid the occurrence of flashover.

SUMMARY OF THE INVENTION

In one aspect of the present invention a super-conducting transformer is provided that includes a first super-conducting coil set, a first lead, wherein the first lead extends from the first super-conducting coil set, lead shielding, wherein the lead shielding surrounds the first lead and wherein the lead shielding is connected to ground, a bushing, and a first insulated feed-through connector, wherein the first lead is coupled to the first feed-through connector, and wherein the first feed-through connector is coupled to the bushing.

In another aspect of the present invention an integral bushing is coupled to the first super-conducting coil set and insulates the first lead.

In another aspect of the present invention, a second super-conducting coil set and an interconnect system are included, wherein the interconnect system connects the second super-conducting coil set to the first super-conducting coil set.

In another aspect of the present invention the first insulated feed-through connector has a first input on a first side of the first insulated feed-through connector, and a second input and a third input on a second side of the first insulated feed-through connector.

In another aspect of the present invention, a power supply lead is included that is input to the first input of the first insulated feed-through connector.

In another aspect of the present invention, a second super-conducting coil set, a third super-conducting coil set and an interconnect system are included, wherein the interconnect system connects the first super-conducting coil set, the second super-conducting coil set and the third super-conducting coil set.

In another aspect of the present invention, the first super-conducting coil set, the second super-conducting coil set and the third super-conducting coil set are connected in a wye configuration.

In another aspect of the present invention, the first super-conducting coil set, the second super-conducting coil set and the third super-conducting coil set are connected in a delta configuration.

In another aspect of the present invention a super-conducting transformer is provided that includes a first super-conducting coil set, a first lead, wherein the first lead extends from the first super-conducting coil set, means for coupling the first lead to the bushing, wherein the coupling means is insulated, and means for insulating the first lead.

In yet another aspect of the present invention a method for connecting leads of a super-conducting transformer is provided that includes coupling a connector to a bushing, connecting a first lead from a first super-conducting coil set to the connector, and insulating the connector and the first lead.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.)

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
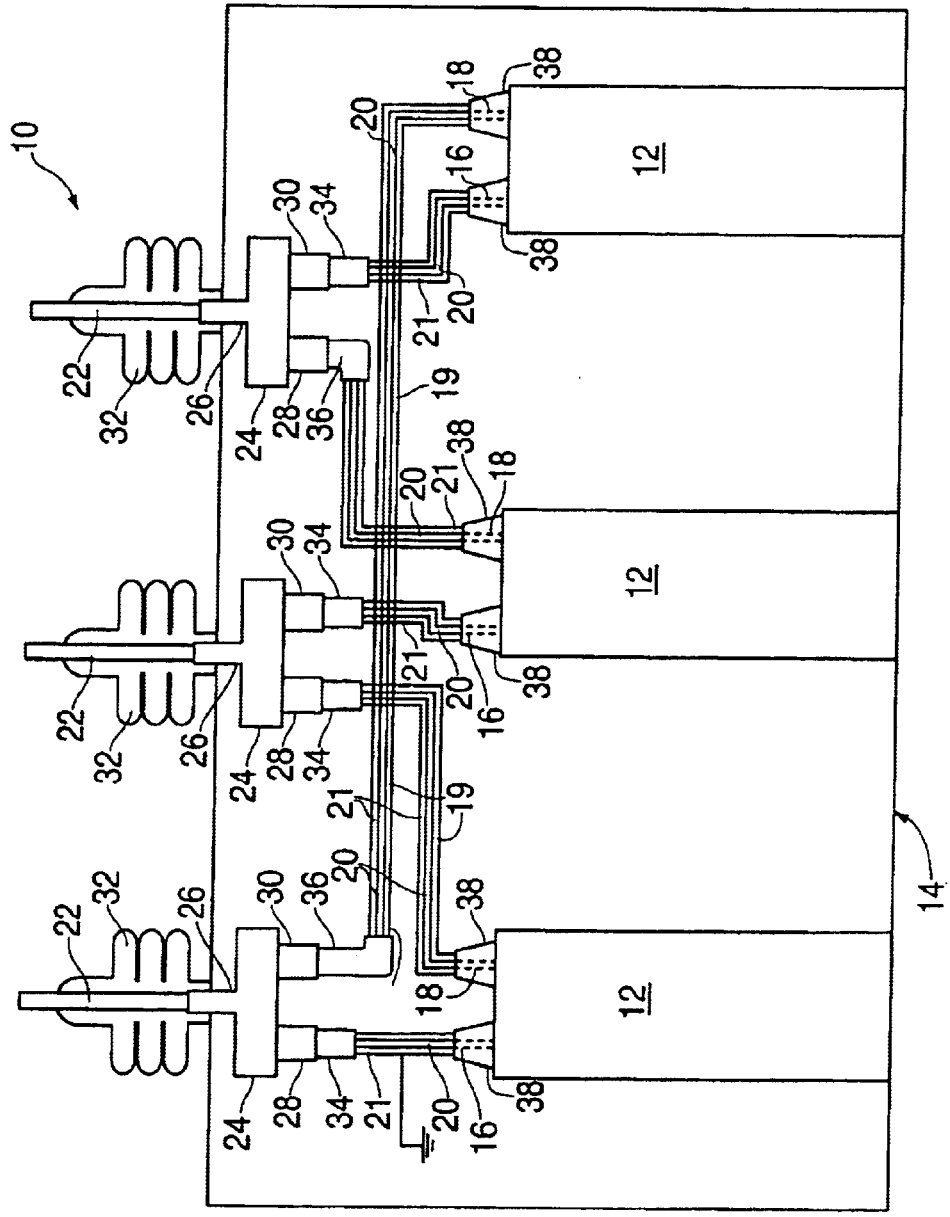
FIG. 1 is a cut-away view of a super-conducting transformer in accordance with a preferred embodiment of the present invention.

Referring now to FIG. 1, wherein like reference numerals indicate like elements, in FIG. 1 there is shown a super-conducting transformer 10 in accordance with the present invention.

As shown in FIG. 1, coil sets 12 are placed within a transformer housing 14. In an exemplary embodiment of a super-conducting transformer 10 in accordance with the present invention, three coil sets 12 are utilized to configure a three-phase transformer. Each phase of the transformer is configured by electrically connecting the input leads 16 and the output leads 18 of the coil sets 12 in, for example, a delta or wye configuration.

The input leads 16 and the output leads 18 are formed from a conductive material, and may be formed separately or continuous with conductors 20 to configure the phases of the transformer. The connections that create the three phases of the transformer are referred as an interconnect system.

To prevent the occurrence of flashovers when connecting the high voltage leads 22 at one voltage potential to the leads 16, 18 and/or conductors 20 of the coil sets 12 that may be at another potential, components are utilized to ground any electric fields that emanate from the leads 16, 18 and/or conductors 20. To prevent flashover, the leads 22 from the high voltage supply, the leads 16, 18, from the coil sets 12, and/or the conductors 20 are covered with an insulating material 19 and shielded. The shielding 21 is connected to ground, such that any electric fields that emanate from the leads 16, 18 and/or conductors 20 are grounded. By grounding the shielding 21, the potential along the shielding 21 is the same at all locations. Accordingly, there is no potential difference between the leads 16, 18 and/or conductors 20 that are insulated and shielded. Thus, flashover between the leads 16, 18 and/or conductors 20 is avoided.

In an exemplary embodiment of the present invention, insulated feed-through connectors 24 each having one input 26 on a first side and two inputs 28, 30 on a second side. The insulated feed-through connectors 24 are utilized to connect the high voltage leads 22 to the leads 16, 18 of the coil sets 12. In an exemplary embodiment of the present invention, each feed-through connector 24 is coupled to a bushing 32 through which a high voltage lead 22 enters the transformer housing 14.

Insulated connectors, such as straight connectors 34, elbow connectors 36, and/or integral bushing connectors 38 are utilized to insulate any portion of the interconnect system, including the leads 16, 18 and/or conductors 20, and thus, exposure is prevented. Thus, any electric fields generated by the high voltage leads 22 and leads 16, 18 are grounded by the insulated feed-through connectors 24, straight connectors 34, elbow connectors 36 and/or integral bushing connectors 38 and/or the shielding 21. Accordingly, there is no potential difference between the high voltage leads 22, leads 16, 18 or conductors 20 that are insulated by the insulated connectors 24, 34, 36, 38, and flashover is avoided.

In an exemplary embodiment of the present invention, the feed-through connectors 24, straight connectors 34, elbow connectors 36, and integral bushing connectors 38 are Elastimold® 200 Amp deadbreak separable connector components manufactured by Thomas & Betts of Albuquerque, New Mexico.

By insulating and/or grounding the components of the interconnect system of a HTS transformer 10, flashover is avoided and the lifetime of the transformer 10 is extended.

Figure 2:
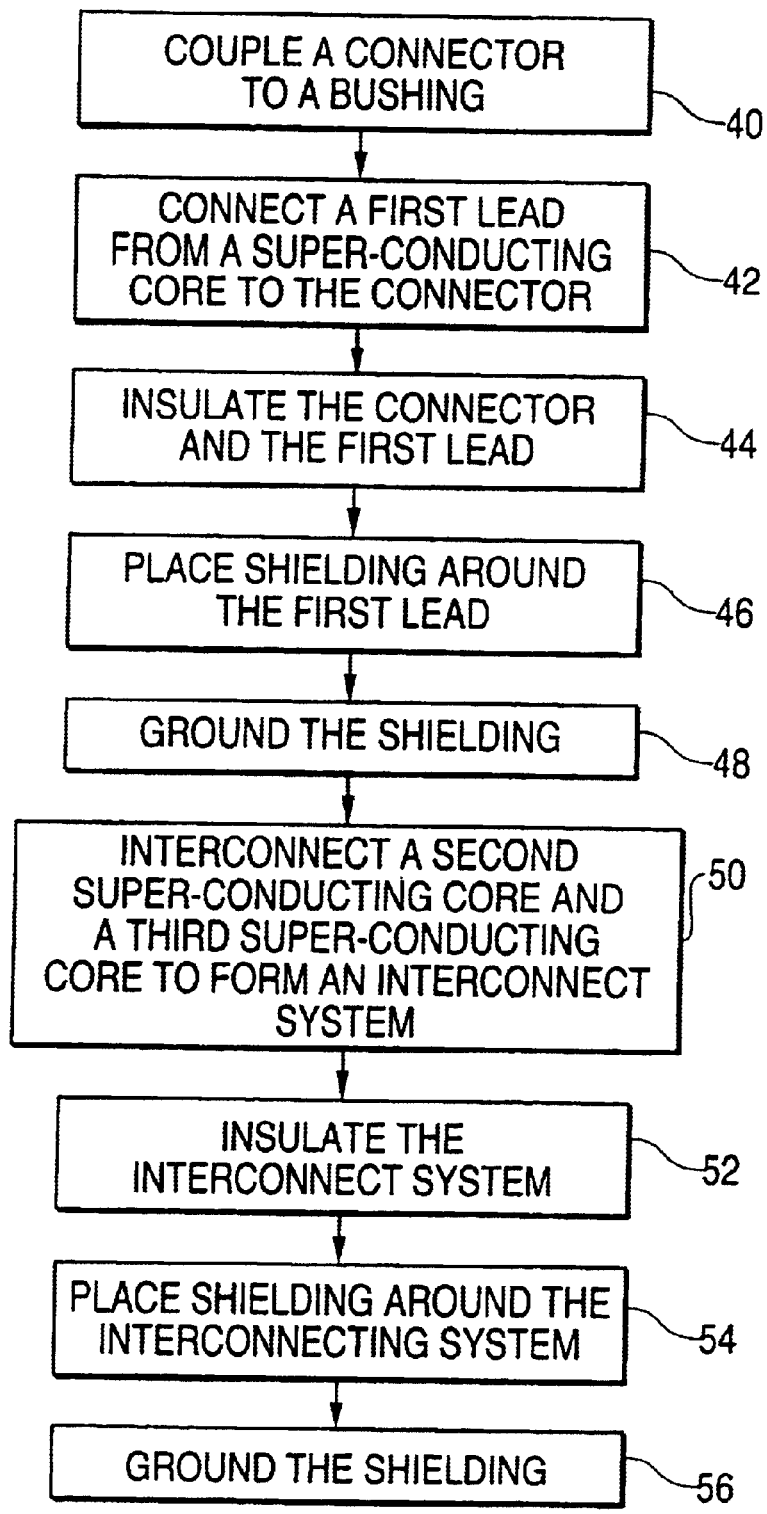
FIG. 2 is a flow chart of a method for connecting leads of a super-conducting transformer in accordance with the present invention.

FIG. 2 is a flow chart describing the steps of an exemplary method for connecting leads of a super-conducting transformer 10 in accordance with the present invention. In step 40, a connector is coupled to a bushing. A first lead from a super-conducting coil set is connected to the connector 42. The connector and the first lead are insulated 44. In step 46, shielding is placed around the connector. The shielding is connected to ground, such that any electrical fields that emanate from the first lead are grounded 48. In an exemplary embodiment of the present invention a second super-conducting coil set and a third super-conducting coil set are interconnected, such that an interconnection system is formed 50. In step 52, the interconnect system is insulated.

Shielding is then placed around the interconnect system 54. In step 56, the shielding is connected to ground 56.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A super-conducting transformer, comprising:
    a transformer housing containing a vacuum;
    a first super-conducting coil set;
    a first lead, wherein the first lead extends from the first super-conducting coil set;
    lead shielding, wherein the lead shielding surround the first lead, and wherein the lead shielding is directly connected to ground;
    a vacuum tolerable bushing; and
    a first insulated housing feed-through connector, wherein the first lead is coupled to the first feed-through connector, and wherein the first feed-through connector is coupled to the bushing.

2. The super-conducting transformer of claim 1, further comprising:
    an insulating material, wherein the insulating material surrounds the first lead.

3. The super-conducting transformer of claim 1, further comprising a vacuum tolerable integral bushing coupled to the first super-conducting coil set, wherein the integral bushing insulates the first lead.

4. The super-conducting transformer of claim 1, further comprising:
    a second super-conducting coil set; and
    an interconnect system, wherein the interconnect system connects the second super-conducting coil set to the first super-conducting coil set.

5. The super-conducting transformer of claim 4, further comprising a third super-conducting coil set, wherein the first super-conducting coil set, the second-super-conducting coil set and the third super-conducting coil set are connected in the interconnect system.

6. The super-conducting transformer of claim 5, wherein the first super-conducting coil set, the second super-conducting coil set, and the third super-conducting coil set are connected on a delta configuration.

7. The super-conducting transformer of claim 5, wherein the first super-conducting coil set, the second super-conducting coil set and the third super-conducting coil set are connected in a wye configuration.

8. The super-conducting transformer of claim 5, further comprising:
    a second housing insulated feed-through connector; and
    a third housing insulated feed-through connector.

9. The super-conducting transformer of claim 8, further comprising:
    a second lead, wherein the second lead extends from the second super-conducting coil set; and
    a third lead, wherein the third lead extends from the third super-conducting coil set.

10. The super-conducting transformer of claim 9, wherein the first lead is input to at least one of the first, second and third feed-through connectors, wherein the second lead is input to at least one of the first, second and third feed-through connectors, and wherein the third lead is input to at least one of the first, second and third feed-through connectors.

11. The super-conducting transformer of claim 1, wherein the first insulated housing feed-through connector has a first input on a first side of the first insulated housing feed-through connector, and a second input and a third input on a second side of the first insulated housing feed-through connector.

12. The super-conducting transformer of claim 11, further comprising a power supply lead, wherein the power supply lead is input to the first input of the first insulated housing feed-through connector.

13. The super-conducting transformer of claim 1, further comprising an elbow connector, wherein the elbow connector is coupled to the first insulated housing feed-through connector.

14. The super-conducting transformer of claim 1, further comprising a straight connector, wherein the straight connector is coupled to the first insulated housing feed-through connector.

15. A super-conducting transformer, comprising:
    a transformer housing containing a vacuum;
    a first super-conducting coil set;
    a first lead, wherein the first lead extends from the first super-conducting coil set;
    means for shielding the first lead, wherein the shielding means is directly grounded;
    means for engaging the first lead to the transformer housing within the vacuum;
    means for coupling the first lead to the engaging means, wherein the coupling means is insulated and vacuum tolerable; and
    means for insulating the first lead.

16. The super-conducting transformer of claim 15, wherein the coupling means has a first input on a first side of the coupling means, and a second input and a third input on a second side of the coupling means.

17. The super-conducting transformer of claim 15, further comprising:
    a second super-conducting coil set;
    a third super-conducting coil set; and
    means for interconnecting the first super-conducting coil set, the second super-conducting coil set, and the third super-conducting coil set.

18. The super-conducting transformer of claim 17, wherein the interconnecting means is an insulated interconnect system.

19. A method for connecting leads of a super-conducting transformer, comprising:
    coupling a connector to a vacuum tolerable bushing at an interface of a vacuumed transformer housing;
    a first super-conducting coil set;
    connecting a first lead from a first super-conducting coil set to the connector;
    shielding the first lead;
    directly grounding the shielding; and
    insulating the connector and the first lead.

20. The method of claim 19, further comprising:
    interconnecting a second super-conducting coil set and a third super-conducting coil set with the first super-conducting coil set to form an interconnect system; and
    insulating the interconnect system.

* * * * *